United States Patent
Vasekin et al.

(10) Patent No.: US 12,292,834 B2
(45) Date of Patent: May 6, 2025

(54) CACHE PREFETCHING

(71) Applicant: Arm Limited, Cambridge (GB)

(72) Inventors: Vladimir Vasekin, Cambridge (GB); Vincent Rezard, Vence (FR); Antony John Penton, Little Canfield (GB); Cédric Denis Robert Airaud, Saint Laurent du Var (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/343,971

(22) Filed: Jun. 29, 2023

(65) Prior Publication Data

US 2025/0004945 A1    Jan. 2, 2025

(51) Int. Cl.
*G06F 12/0862*     (2016.01)

(52) U.S. Cl.
CPC .... *G06F 12/0862* (2013.01); *G06F 2212/602* (2013.01)

(58) Field of Classification Search
CPC ................ G06F 12/0862; G06F 2212/602
See application file for complete search history.

(56) References Cited

U.S. PATENT DOCUMENTS

| | | | | |
|---|---|---|---|---|
| 7,533,242 | B1* | 5/2009 | Moll | G06F 9/30047 711/213 |
| 2006/0026408 | A1* | 2/2006 | Morris | G06F 9/3846 712/E9.052 |
| 2009/0198905 | A1* | 8/2009 | Arimilli | G06F 12/1027 711/E12.004 |
| 2009/0198906 | A1* | 8/2009 | Armilli | G06F 12/1027 711/E12.001 |
| 2016/0034400 | A1* | 2/2016 | Dale | G06F 12/0862 711/122 |
| 2016/0188476 | A1* | 6/2016 | Yu | G06F 9/3455 711/137 |
| 2022/0091847 | A1* | 3/2022 | Ashkar | G06F 9/30047 |
| 2023/0229596 | A1* | 7/2023 | Shulyak | G06F 12/0862 711/137 |

* cited by examiner

*Primary Examiner* — Ryan Bertram
(74) *Attorney, Agent, or Firm* — NIXON & VANDERHYE P.C.

(57) ABSTRACT

An apparatus comprises associating circuitry to associate an indirect prefetch condition with a memory access request when hint information indicates that the data to be accessed in response to the memory access request is address indicating data which is to be used to generate a second address for a subsequent memory access request. A second address can be generated using the address indicating data, and a prefetch memory access request can be issued to seek to make data at the second address available in the associated cache.

18 Claims, 8 Drawing Sheets

Demand access request

CACHE PREFETCHING

BACKGROUND

Technical Field

The present technique relates to the field of data processing. More specifically, the present technique relates to cache prefetching.

Technical Background

Many data processing systems provide caches, in which data can be stored. Caches provide storage that is typically quicker to access than memory. However, if a cache does not hold a copy of data when it is requested in response to an access request, then it will be necessary to access that data from a further level of cache or memory, which can slow down responding to the access request. Prefetching circuitry may be provided to improve performance by seeking to reduce the probability that an access request misses in the cache, by predicting future access requests and prefetching information into the cache in advance of receiving an access request for the information. However, with certain types of access patterns it may be difficult to accurately predict future access requests, and therefore it may be difficult for a prefetcher to improve performance in certain situations.

SUMMARY

At least some examples of the present technique provide an apparatus, comprising:
associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
address generating circuitry, responsive to association of the indirect prefetch condition with the first memory access request and determination that the address indicating data associated with the first address is available in an associated cache, to generate a second address using the address indicating data; and
prefetch request issuing circuitry configured to issue prefetch memory access requests to seek to make data available in the associated cache in anticipation of access to said data being requested by the associated processing circuitry;
wherein the prefetch request issuing circuitry, responsive to the address generating circuitry generating the second address, is arranged to issue a prefetch memory access request to seek to make data at the second address available in the associated cache.

At least some further examples of the present technique provide a data processing method, comprising:
associating an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
generating, in response to association of the indirect prefetch condition with the first memory access request and determination that the address indicating data associated with the first address is available in an associated cache, a second address using the address indicating data; and
issuing, responsive to the generation of the second address, a prefetch memory access request to seek to make data at the second address available in the associated cache.

At least some examples of the present technique provide a non-transitory computer-readable medium to store computer-readable code for fabrication of an apparatus comprising:
associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
address generating circuitry, responsive to association of the indirect prefetch condition with the first memory access request and determination that the address indicating data associated with the first address is available in an associated cache, to generate a second address using the address indicating data; and
prefetch request issuing circuitry configured to issue prefetch memory access requests to seek to make data available in the associated cache in anticipation of access to said data being requested by the associated processing circuitry;
wherein the prefetch request issuing circuitry, responsive to the address generating circuitry generating the second address, is arranged to issue a prefetch memory access request to seek to make data at the second address available in the associated cache.

At least some further examples of the present technique provide a system comprising: the above-mentioned apparatus, implemented in at least one packaged chip; at least one system component; and a board, wherein the at least one packaged chip and the at least one system component are assembled on the board. A chip-containing product may also be provided comprising the above-mentioned system assembled on a further board with at least one other product component.

Further aspects, features and advantages of the present technique will be apparent from the following description of examples, which is to be read in conjunction with the accompanying drawings.

DESCRIPTION OF EXAMPLES

Figure 1:
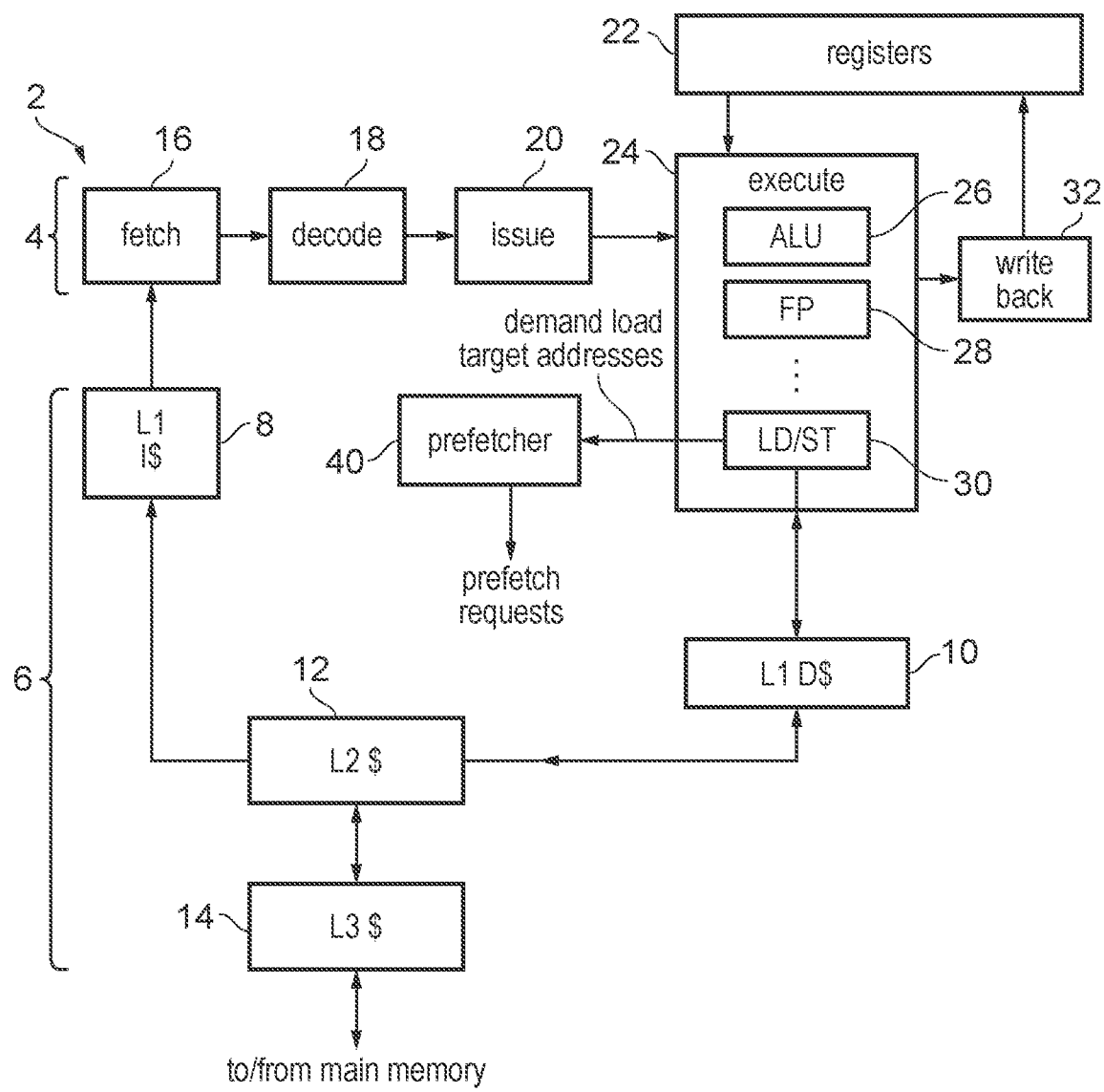
FIG. 1 schematically illustrates an example of a data processing apparatus according to examples of the present technique.

In a data processing system, a cache can be used to store information so that access to that information can be carried out more quickly than if it were stored only in memory. The information stored in a cache is not particularly limited, and may for example include data and instructions (referred to generally herein as "data"). If a cache lookup performed in response to an access request misses, this means that the cache does not hold a copy of the requested information, and the requested information may be retrieved from a further level of cache or from memory, which introduces a delay and slows down the access request, potentially impacting performance of the data processing apparatus. Prefetching circuitry can be used to reduce the likelihood of a cache miss by prefetching items of information into the cache in advance of an access request being received for said items of information. The prefetcher may predict future access requests, and prefetch items of information based on the predictions.

In some systems, a prefetcher is configured to predict addresses of future access requests based on recognising patterns in series of observed memory access requests issued by associated processing circuitry. In these examples, when a pattern of addresses is identified in the memory access requests, the pattern may be extrapolated and prefetch requests may be issued to the extrapolated addresses. For example, memory access requests may be observed (potentially with intervening access requests) for addresses separated by a predictable value, such as a constant stride (e.g., notional addresses 0, 2, 4, 6, etc.) allowing addresses of future memory access requests to be predicted by following the pattern. This may commonly arise when accessing instructions or regular data structures in memory.

However, the inventors have identified certain access patterns where known prefetchers have difficulty predicting future access requests, and therefore the performance improvements of using a prefetcher are reduced. Said access patterns include a series of memory access requests in which a first memory access request causes an item of data to be loaded, and the loaded data is used to generate an address for a subsequent memory access request. This pattern may arise in several situations, but in one example situation it may be desired to access a matrix stored in memory having a subset of elements with the value of zero. To avoid the overhead of loading and processing elements known to be zero, an array may also be stored in memory identifying the non-zero matrix elements. Hence, a first access may be to the array to load data identifying a non-zero element, and a subsequent access may be to access said non-zero element of the matrix having its address calculated using the data loaded from the array.

In such an access pattern, the address of the subsequent memory access can be very difficult to predict, because it is based on arbitrary data loaded from memory. This means that, unlike other access patterns where subsequently accessed addresses may be predictable based on addresses accessed earlier (for example, if they are part of a stride pattern), the subsequent memory access to an address calculated based on data in memory does not follow a predictable pattern. Hence, it can be very difficult to prefetch data for the subsequent memory access request to an address based on data loaded from memory.

To alleviate this problem according to the present technique, an apparatus comprises associating circuitry configured to associate an indirect prefetch condition with a first memory access request in response to anticipating, based on hint information received from associated processing circuitry, that the data to be accessed at the first address in response to the first memory access request is address indicating data which is to be used to generate a second address for a subsequent memory access request. That is, processing circuitry provides a hint associated with a first access request, the hint indicating that the data returned in response to that request will be used to generate a second address for a subsequent memory access. This hint allows downstream circuitry to identify a situation where prefetching the data at the second address may improve performance. The associated processing circuitry may be the circuitry to which data requested in the first memory access request is returned. As will be discussed below, the hint information is not particularly limited and may take a variety of forms. In some examples, the hint may not be directly associated with the first memory access request, but may be linked with the first memory access request indirectly (for example, as will be discussed below, if the first memory access request is part of a series of access requests in which one access request has been directly associated with a hint). Similarly, the way in which a memory access request is associated with the indirect prefetch condition is not particularly limited. In some examples, associating an access request with the indirect prefetch condition could involve storing information identifying memory access requests associated with the indirect prefetch condition. In other examples, associating the indirect prefetch condition with a memory access request could involve forwarding some information identifying the memory access request associated with the indirect prefetch condition to further circuitry (such as address generating circuitry).

The apparatus also comprises address generating circuitry. In response to association of the indirect prefetch condition with the first memory access request (in other words, identification that the data to be accessed at the first address is anticipated to be used to generate an address for a subsequent memory access) and determination that the address indicating data associated with the first address is available in an associated cache, the address generating circuitry is configured to generate a second address using the address indicating data. The associated cache could be one or more caches of one of more levels of cache associated with the memory system to be accessed by the associated processing circuitry, and is a storage structure from which one or more components within the apparatus may be configured to access data. In some examples, the address indicating data may become available in the associated cache in response to the processing of the first memory access request, however it will be appreciated that the address indicating data could already be present in the associated cache prior to the first memory access request.

The apparatus also comprises prefetch request issuing circuitry configured to issue prefetch memory access requests to seek to make data available in the associated cache in anticipation of access to said data being requested by the associated processing circuitry. Responsive to the address generating circuitry generating the second address, the prefetch request issuing circuitry may be arranged to issue a prefetch memory access request to seek to make data at the second address available in the associated cache.

Therefore, according to the present technique a prefetch request is issued to a second address calculated based on data stored in memory at a first address when it is anticipated that the data stored at the first address will be used to generate an address for a subsequent memory access request. This may allow the data at the second address to be present in the cache in advance of the anticipated subsequent memory access request, so that the subsequent memory access request can be serviced with reduced latency, and performance can be improved. Such an approach allows data to be prefetched into a cache even when the data to be accessed in the subsequent memory access is located at an arbitrary address in memory which would not typically be covered by existing prefetching schemes.

The first memory access request may be one of several types of memory access request. As will be discussed below, in some examples the first memory access request may be a prefetch request. In some examples the associating circuitry is configured to observe demand memory access requests issued by the associated processing circuitry (from which the hint information is received) to access data in the memory system, and the first memory access request may be one of the demand memory access requests. A demand memory access request may be associated with the indirect prefetch condition when the demand memory access request is issued by the associated data processing circuitry in association with the hint information.

As mentioned above, there are several ways in which a hint could be associated with a particular memory access request. For example, a message could be transmitted from the associated processing circuitry to the associating circuitry comprising hint information identifying one or more memory access requests for which it is anticipated that returned data will be used to generate an address. In other examples, the associated processing circuitry may store hint information in a storage location to which the associating circuitry has access. In another particularly efficient example, a hint from the associated processing circuitry could be provided within a demand memory access request issued by the associated processing circuitry. The hint could for example be provided in the encoding of a given demand memory access request, said encoding indicating that said demand memory access request is an access request to access data which is anticipated to be used to calculate a second address. This could involve providing a new request type to indicate memory access requests for accessing address indicating data, or could involve providing one or more bits in the demand memory access request which may be set to indicate that said demand memory access request is to access address indicating data. The approach of providing hint information within demand memory access requests may be particularly efficient because it may involve minimal modifications to existing circuitry, and provides a strong association between particular hint information and particular demand access requests without requiring logic to track which hints are associated with which access requests.

In some examples, the apparatus may comprise pattern detection circuitry to observe demand access requests issued by the associated processing circuitry and identify a series of associated demand memory access requests for accessing data at a corresponding series of addresses following an identified pattern. This circuitry may be provided to identify more conventional access patterns for prefetching, such as stride patterns where demand access requests are offset by predictable amounts, which may be provided in addition to prefetching based on the indirect prefetch condition as discussed above.

The prefetch request issuing circuitry may be configured to issue prefetch requests for extrapolated addresses following the identified pattern of addresses, in advance of observing demand memory access requests for said addresses. For example, if a series of demand access requests are identified (by the pattern detection circuitry) to addresses offset by a predictable amount then, predicting that the pattern will continue, prefetch requests may be issued to extrapolated addresses fitting the pattern.

The inventors have realised that there are memory access patterns where first memory accesses load data to generate addresses for subsequent memory accesses, and the first memory accesses are themselves part of a regular series of memory access requests. For example, using the example provided above in which an array stored in memory provides addresses for accessing elements of a matrix stored in memory, the first memory access requests to the array may be regular and predictable (in comparison to the subsequent memory accesses based on data stored in memory which are, as discussed above, arbitrary). Hence, the pattern detection circuitry may identify a pattern within the first memory access requests, and the prefetch request issuing circuitry may therefore issue prefetch requests by extrapolating the identified pattern, to prefetch the (address indicating) data from the addresses specified by the first memory access requests.

The inventors have realised that this provides an opportunity to further improve performance by enabling prefetching further in advance. In particular, if a series of memory access requests are identified in which at least one memory access request is for accessing address indicating data (for example as indicated by a hint received from the processing circuitry issuing the requests), then it has been realised that this allows an assumption to be made that the series of memory access requests are all for accessing address indicating data (e.g., assuming that the series of requests is for accessing an array of address indicating data in memory). Hence, in some examples, responsive to determining that at least one demand memory access request in the series of associated demand memory access requests is associated with the indirect prefetch condition, the associating circuitry is configured to associate the indirect prefetch condition with the one or more first prefetch memory access requests. That is, despite not being directly associated with a hint, the one or more first prefetch memory access requests can be indirectly associated with hint information, and therefore can be associated with the indirect prefetch condition.

Then, because the one or more first prefetch requests have been associated with the indirect prefetch condition, when the address indicating data requested in those prefetch requests is available in the associated cache, one or more further addresses can be calculated based on the returned data and one or more further prefetch requests can be issued based on the further addresses.

In such a way, both the regular array containing the address indicating data and data at the addresses indicated by the address indicating data can be prefetched, even though the addresses indicated by the address indicating data are located at arbitrary locations in memory. This can allow prefetching to be performed much further in advance, because the first access request does not need to have been issued yet by processing circuitry. This allows more time for data to be returned from a lower level of cache or memory before the subsequent memory access request is issued, making it more likely that the data is available in the cache in advance of observing the subsequent memory access request.

In some examples, each demand memory access request with which the indirect prefetch condition is to be associated is directly associated with hint information. However, when demand access requests are part of a series of associated demand access requests, the overhead of providing hint information can be reduced by associating one of the demand access requests with hint information, and allowing the other demand access requests in the series of requests to be indirectly associated with the hint information. Hence, in some examples, responsive to determining that an earlier demand memory access request in the series of associated demand memory access requests is associated with the indirect prefetch condition, the associating circuitry is configured to associate the indirect prefetch condition with one or more later demand memory access requests in the series of associated demand memory access requests. This can be performed in addition to associating the indirect prefetch condition with one or more prefetch requests following the identified pattern of the series of demand access requests.

As mentioned above, the pattern detection circuitry may identify a series of associated demand access requests based on directly detecting the identified pattern of addresses. For example pattern recognition logic could identify whether there are any regular access patterns within a stream of demand access requests. However, in addition or instead, the pattern detection circuitry may also identify a series of associated demand memory access requests based on receiving pattern hint information indicative of the identified pattern of addresses.

For example, the associated processing circuitry could identify that a series of memory access requests are to be issued, and provide pattern hint information indicating the series of access requests to the pattern detection circuitry. This means that a series of memory access requests can be identified more quickly than if the pattern were detected by pattern recognition logic (where a certain number of requests fitting a pattern may be observed before confidence is high enough to begin prefetching based on that pattern). This also reduces overhead by reducing the amount of processing requiring use of the pattern recognition logic. In some examples, the associated processing circuitry may identify an instruction to access an array in memory, determine that regular accesses will be issued to access the array of indices, and issue the pattern hint information. For example, the pattern hint information could be provided as metadata in a first demand access of a series.

The associated processing circuitry may be configured to perform data processing operations in response to instructions. In some examples, the hint information may be transmitted to the associating circuitry in respect of a given demand memory access request in response to detection that one or more instructions to be executed by the associated data processing circuitry are anticipated to use data returned in response to the given demand memory access request to generate an address for a subsequent demand memory access request. Hence, a prediction can be made based on the instructions of a program that the indirect prefetch condition should be associated with one or more memory access requests. There may be several different ways that this can be implemented, with detection of the one or more instructions occurring at one or more of several different stages of the processing pipeline.

In some examples, the associated processing circuitry is configured to transmit the hint to the associating circuitry in response to detecting a sequence of two or more instructions in which execution of a first instruction will cause the given demand memory access request to be issued in order to store data in a given storage location and execution of a subsequent instruction will cause that data stored in the given storage location to be used to generate an address for accessing the memory system. In these examples, the hint information is to be associated with the demand memory access request caused by the first instruction, based on a subsequent instruction. Hence, circuitry for detecting the condition may be provided at a relatively early stage of the pipeline, such as at the decode stage, to allow the condition to be detected (and a determination made that the hint information is to be associated with the demand memory access request) based on the second instruction, before the first instruction reaches the issue stage and is issued.

There may be certain types of instruction which are frequently used in situations where data returned in response to a first memory access request is used to generate an address for a subsequent memory access request, and where presence of such an instruction (even if a second instruction has not yet been observed) may indicate that the hint information should be transmitted to the associating circuitry. Hence, in some examples, the associated processing circuitry is configured to transmit the hint to the detection circuitry in response to detecting a predetermined type of instruction corresponding to the given demand memory access request. The predetermined type of instruction may cause one or more demand memory access requests to be issued, and the hint information may be associated with the one or more demand memory access requests caused by said predetermined type of instruction. For example, particular versions of a gather load instruction may be used to load address indicating data from memory to a vector, where in certain workloads it can be predicted that the data in the vector would then be used in response to a later instruction to calculate addresses for one or more subsequent memory accesses. Observing the predetermined type of instruction may indicate that the subsequent memory accesses to addresses based on the loaded data are likely enough to be issued that performance may be improved by prefetching data from said addresses based on the data fetched in response to the predetermined type of instruction.

The address generating circuitry may calculate the second address from the address indicating data in several ways. In some examples, the address indicating data is a pointer to an address in memory, and is therefore already the second address. In other examples the address indicating data may be an index which is to be combined with an offset to generate the address. The same offset may be used to calculate addresses for regions of memory, and therefore may be reused by the address calculating circuitry to calculate more than one second address.

The offset may be provided to the address generating circuitry by the associated processing circuitry. This could be carried out in different ways. For example, the offset corresponding to one or more demand memory access requests may be stored in a memory location accessible by the address generating circuitry. In other examples, one or more demand memory access requests issued by the associated processing circuitry could include part or whole of the offset corresponding to a particular group of demand access requests. For example, the offset could be included within the hint information provided to the associating circuitry, such that the hint associated with a particular demand memory access request indicates that the data returned in response to said access request will be used to generate a second address, and provides the offset to allow the second address to be calculated for prefetching.

It has been discussed above how the address generating circuitry may be responsive to association of the indirect prefetch condition with a particular memory access request and availability of data associated with the first address in the associated cache to generate the second address for prefetching. If the address indicating data is not available in the associated cache when the indirect prefetch condition is associated with a given memory access request, then the address generating circuitry may be unable to immediately generate the second address. However, this does not mean that the second address can never be generated for prefetching. In some examples, a second address (for prefetching) may be generated in response to address indicating data associated with a given address becoming available in the cache (for example, in response to processing of the first access request associated with the indirect prefetch condition). Circuitry may be provided to keep track of which accesses should trigger calculating of an address for prefetching when data associated with those accesses becomes available in the associated cache. The circuitry may take a variety of forms, but in one example implementation comprises indirect prefetch buffer circuitry responsive to association of the indirect prefetch condition with the first memory access request and determination that the address indicating data associated with the first address is not yet available in the associated cache to store, in an entry of a data structure, information to enable the address generating circuitry to identify when the address indicating data associated with the first address is available in the associated cache so that it may generate the second address using said address indicating data. The information stored in the data structure entry may for example be indicative of an address or part of an address indicating the location in memory where the address indicating data is stored, so that it can be identified when this data becomes available in the associated cache. In response to a determination that address indicating data corresponding to an entry of the data structure is available in the associated cache, the address generating circuitry can be configured to generate the second address using said address indicating data. Hence, even if the address indicating data is not initially available in the associated cache, by keeping track of addresses containing address indicating data, addresses for prefetching can be calculated when the address indicating data becomes available.

Particular examples will now be described with reference to the Figures.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analysing patterns of demand target addresses specified by demand memory access requests issued by the load/store unit 30, and detecting address access patterns which can subsequently be used to predict addresses of future memory accesses. For example, the address access patterns may involve stride sequences of addresses where there are a number of addresses separated at regular intervals of a constant stride value. It is also possible to detect other kinds of address access patterns (e.g. a pattern where subsequent accesses target addresses at certain offsets from a start address). The prefetcher 40 maintains prefetch state information representing the observed address access patterns, and uses the prefetch state information to generate prefetch load requests which are issued to the memory system 6 to request that data is brought into a given level of cache. For example, when a trigger event for a given access pattern is detected (e.g. the trigger event could be program flow reaching a certain program counter address, or an load access to a particular trigger address being detected), the prefetcher 40 may begin issuing prefetch load requests for addresses determined according to that pattern. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled.

The prefetcher 40 may be able to perform prefetching into a single cache or into multiple caches. Level 1 cache prefetch requests may be sent to the level 2 cache 12 or downstream memory and request that data from prefetch target addresses is brought into the level 1 data cache 10. The prefetcher may issue level 1 cache prefetch requests in response to determining that the level 1 cache 10 does not hold a copy of the data to be prefetched, and the prefetcher may therefore send a request to the level 2 cache 12 directly. Alternatively, the level 1 prefetch request could be sent to the level 1 cache 10 by the prefetcher 40 without knowledge of whether the data is already present in the level 1 cache 10. The level 1 cache 10 could then treat the prefetch request in a similar way to a demand access request by performing a lookup and requesting the data from the level 2 cache 12 in response to determining that it does not hold a copy of the data requested in the prefetch request.

The prefetcher 40 could also issue level 2 and level 3 prefetch requests to the main memory requesting that data from prefetch target addresses is loaded into the level 2 cache 12 or the level 3 cache 14 respectively. The level 3 prefetch requests may look a longer distance into the future than the level 1 or level 2 prefetch requests to account for the greater latency expected in obtaining data from main memory into the level 3 cache 14 compared to obtaining data from a level 3 cache 14 into the level 2 cache 12 or from the level 2 cache 12 into the level 1 cache 10. In systems using both level 1 and level 2 or 3 prefetching, the level 2 or 3 prefetching can increase the likelihood that data requested by a level 1 prefetch request is already in the level 2 or 3 cache. However it will be appreciated that the particular caches loaded based on the prefetch requests may vary depending on the particular circuit of implementation. Hence, FIG. 1 illustrates prefetch requests issued generally by the prefetcher, with the understanding that these may be issued to one of several caches.

Figure 2:
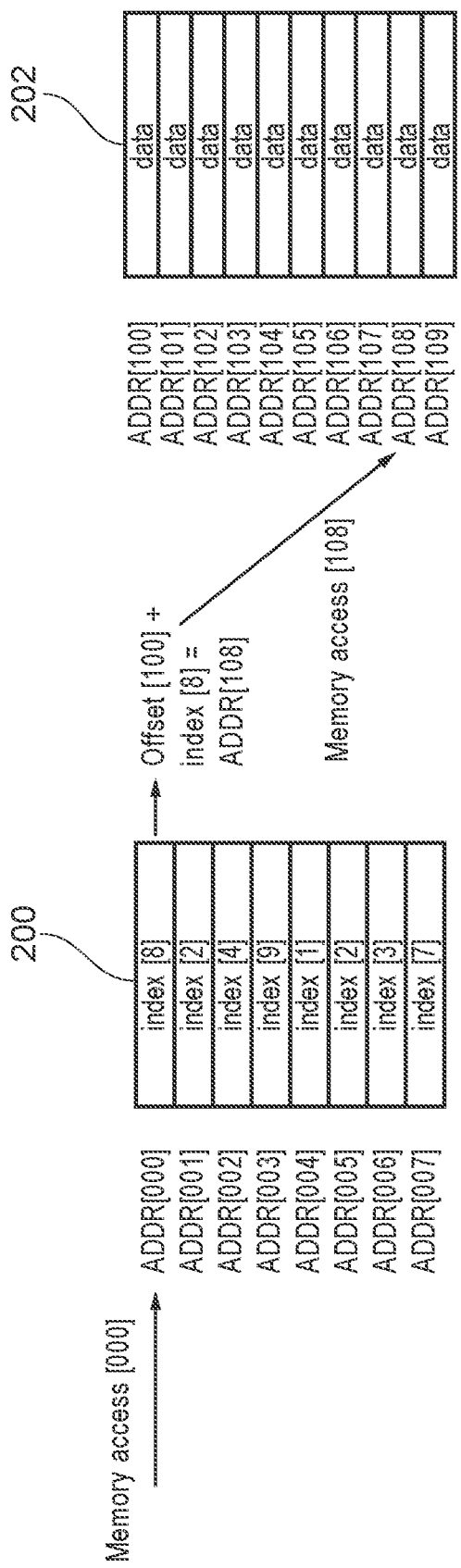
FIG. 2 schematically illustrates an address space and memory access requests for illustrating concepts described herein.

The inventors of the present technique have recognised that there are situations where previous prefetchers struggle to improve performance. In particular, there are situations where future memory accesses are issued to addresses which do not follow a predictable pattern, and therefore it can be difficult to predict addresses of future memory accesses. FIG. 2 illustrates an example of such a memory access pattern.

FIG. 2 schematically illustrates a number of memory locations associated with addresses. Addresses associated with a corresponding memory location have been indicated in the format ADDR [xxx], but it will be appreciated that this address format is only for illustrating the concepts of the present invention. Accesses to addresses are illustrated with arrows, and it is to be understood that an access to data associated with an address may not actually access that data from memory, and may instead access the data from a cache or other location in the memory system (such as a store queue), and therefore the arrows merely illustrate how the addresses are accessed logically in an address space but not necessarily within a memory.

As illustrated in FIG. 2, some storage locations 200 may store address indicating data. This may be in the form of an index (as illustrated in FIG. 2) which can be combined with an offset (a base address) to provide an address to a further location in memory. Equivalently, there may be no requirement for the offset and the address indicating data may instead be a pointer directly identifying an address.

A first memory access request (which could be a demand access request or a prefetch request) may cause data to be read from a location 200 in memory storing address indicating data. Processing circuitry to which data was returned in response to the first memory access request may make use of the loaded data to form a further address, and may issue a further memory access request to the further address 202. As illustrated in FIG. 2, a first memory access request to address reads the index value which is combined with the offset [100] to form address [108], and a subsequent memory access request is issued to address [108]. The memory location identified by the further address may store any arbitrary data.

This type of access pattern may arise in several different types of processing workloads. In one example, a matrix is stored in memory. The region of memory containing the matrix may start at an offset address, such that addresses of locations in the matrix can be derived by combining the offset with an index. In certain cases, such as when the matrix has been formed by subtracting one matrix from another, there may be a relatively large number of zero elements in the matrix, which may be located at arbitrary addresses in the matrix. Rather than accessing every element of the matrix for subsequent processing, it can be useful in some cases to avoid overhead by only accessing the non-zero entries, and therefore an array may also be provided in memory which identifies the locations of the non-zero entries. Therefore, to access the matrix, address indicating data may be read from the array 200 and used to access non-zero entries of the matrix 202. In such an example, the block 200 illustrated on the left side of FIG. 2 may represent the array, and the block 202 illustrated on the right side may represent the matrix. It will be appreciated that despite illustrating these structures as contiguous blocks of addresses, the elements of the array and/or the matrix do not need to be located contiguously in memory.

In access patterns such as that illustrated in FIG. 2, where a subsequent memory access request is to an address calculated based on address indicating data stored in memory, the address of the subsequent access can be difficult to predict, as the address indicating data may be arbitrary. The subsequent memory access request can therefore be to an address which is not related to an earlier address as part of a predictable pattern.

The present technique seeks to provide prefetching for addresses accessed in such a manner, and thereby improve performance by reducing cache misses.

Figure 3:
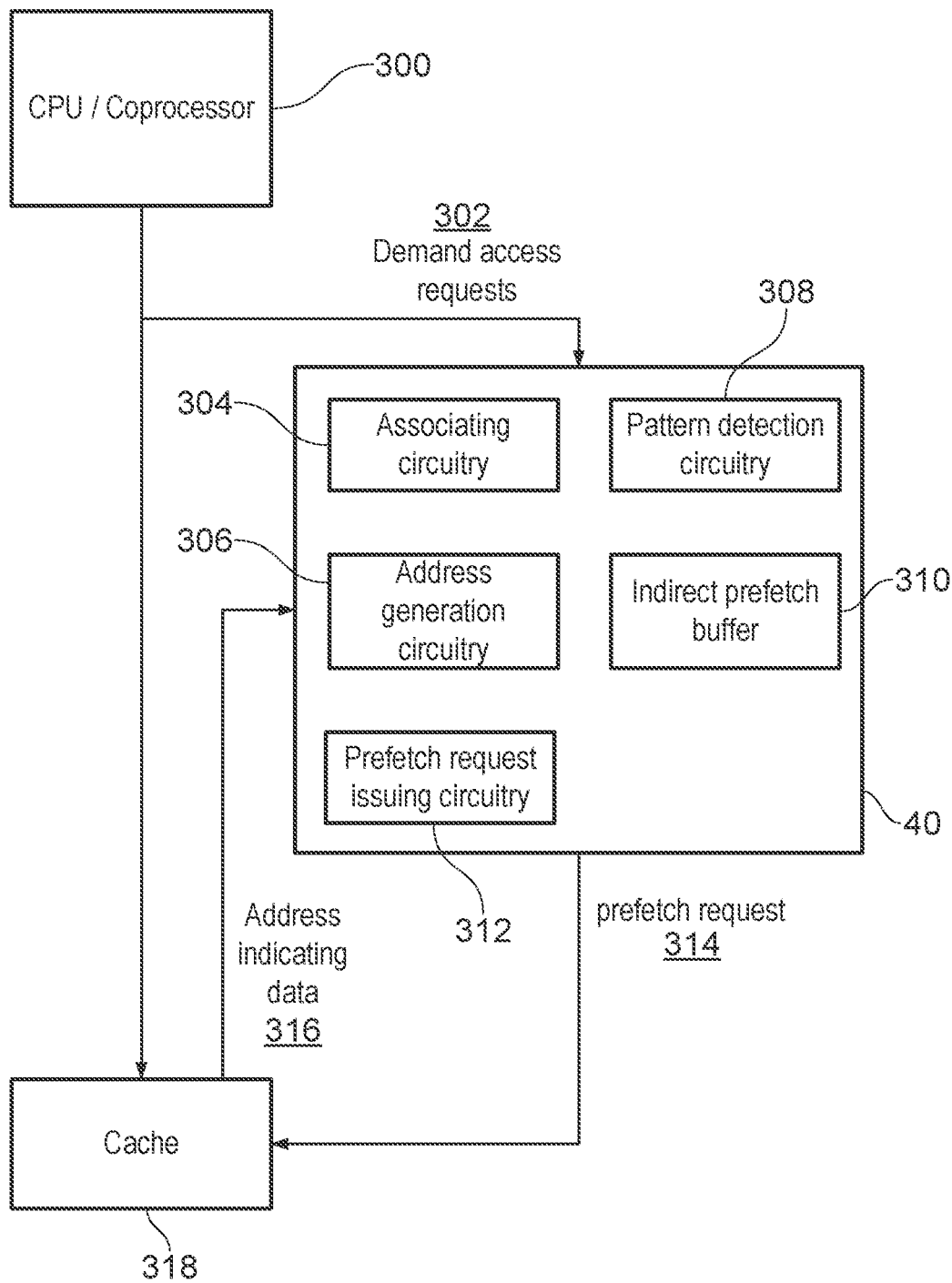
FIG. 3 schematically illustrates an example of a data processing apparatus according to examples of the present technique.

FIG. 3 illustrates an apparatus according to examples of the present technique. A CPU/coprocessor 300 is illustrated. This may also be referred to elsewhere as associated processing circuitry. The CPU/coprocessor 300 may include elements of the processing pipeline 4 illustrated in FIG. 1, and is generally for performing processing operations in response to instructions. The CPU/coprocessor 300 has access to a cache 318 (which may for example be a level 1 cache) to store data and/or instructions for processing, where data stored in the cache 318 is quicker to access than data stored in a memory or a further level of cache.

A prefetcher 40 is also provided. The prefetcher 40 comprises pattern detection circuitry 308 which may be used to perform pattern recognition based on demand access requests issued by the CPU 300 to the memory system. If a series of demand access requests 302 are observed in which a pattern is detected, then the prefetch request issuing circuitry 312 may calculate a prefetch address which fits the pattern, and issue prefetch requests to the cache 318 (or a lower level of cache) to request that data at the prefetch address is made available in the cache 318 (with the intent being that the data is made available before a demand access request 302 is issued by the CPU 300 for that data).

The prefetcher 40 also comprises associating circuitry 304 configured to observe demand access requests 302 issued by the CPU 300 and prefetch requests 314 issued by the prefetch request issuing circuitry 312. As will be discussed in greater detail below, the associating circuitry is responsive to a hint issued by the CPU 300 to associate certain memory access requests with an indirect prefetch condition. In some examples, the hint is included in certain memory access requests 302, and therefore the hint may be transmitted from the CPU 300 to the associating circuitry 304 via demand memory access requests 302. Alternatively the hint may be transmitted to the associating circuitry 304 via a separate message, or by storing the hint information in a storage location accessible to the associating circuitry 304.

When a given memory access request for accessing data at a first address is associated with the indirect prefetch condition, then when data (which is anticipated to be address indicating data) 316 associated with the first address is available in the cache 318, address generation circuitry 306 is configured to use the address indicating data to generate a second address. The prefetch request issuing circuitry 312 can then issue a prefetch request 314 to request that data at the second address is made available in the cache 318. In this way, when it is anticipated that a first memory access request is for accessing data to be used to generate a second address for a subsequent memory access request, then the prefetcher 40 is able to identify this situation based on a hint, calculate the second address, and issue a prefetch request for the second address to seek to make the data at the second address available in the cache in advance of the anticipated subsequent memory access request.

In the case that the data requested in the first memory access request is not available in the cache 318, then the address generation circuitry 306 is not yet able to calculate the second address. However, because the first memory access request is a request for said data, it is anticipated that the data will become available in the cache 318 as a result of processing the first memory access request. Therefore, an indication of the first address can be stored in an indirect prefetch buffer 310 until the first memory access request has caused the address indicating data to become available in the cache 318, and when the address indicating data becomes available in the cache 318, in response to the first memory access request or otherwise, then the data can be used by the address generation circuitry 306 to generate the second address for prefetching.

Figure 4:
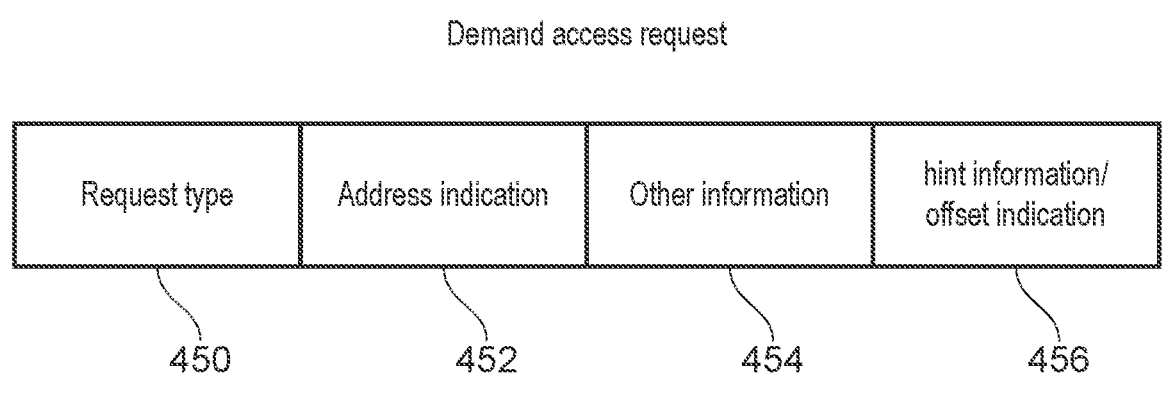
FIG. 4 illustrates an example encoding of a demand access request according to examples of the present technique.

FIG. 4 illustrates an example encoding of a demand access request 302 which may be issued by the CPU 300. The demand access request may be a read request, but in some examples may be a write request (noting that write requests can also cause data to be retrieved from memory, in order that said data can be modified and then returned to memory—for example by retrieving a cache line's worth of data and then updating one or more data values in that cache line based on the write request to produce a modified cache line's worth of data). A request type field 450 of the demand access request identifies the type of request. An address indication field 452 provides information identifying a location in memory associated with the request. Processing of the request may be arranged to cause data to be read from a location associated with the address identified by the address indication field 452. The request may also include a field 454 for any other information which may be included in the request, such as information identifying how much data should be returned in response to the request, or in the case of a write request the payload data to be stored to memory.

A demand access request as used in the present technique may also include a field 456 for providing indirect prefetch information. The field 456 may include one or more hint information bits which can be used to indicate whether the demand access request is for accessing address indicating data or not. For example, the field 456 may comprise a flag which in one state indicates that the demand access request is for accessing address indicating data and in another state indicates that the demand access request is not for accessing address indicating data. The field 456 may also comprise offset information. For example, if the hint information identifies that the request is for accessing address indicating data, and said address indicating data is an index, then the offset may be provided in the demand access request to allow the address generation circuitry 306 to use the index in combination with the offset to calculate the second address. The offset information may in some cases be provided in two or more demand access requests, such that part of the offset is provided in each demand access request, which can be useful if there is not sufficient space in the field 456 for a whole offset.

The CPU/coprocessor 300 can use decoded instructions to identify situations in which it should issue a hint associated with a demand access request. For example, if a first instruction is observed for loading data from memory and a second instruction is observed for accessing an address using the data loaded from memory, then a situation can be identified in which hint information could be associated with the access request issued in response to the first instruction. As an example, the CPU 300 could decode the following instructions:

LD1SW {Z4.D}, P2/Z, [X26, X20, LSL #2]
LD1D {Z5.D}, P2/Z, [X25, Z4.D, LSL #3]

The LD1SW (scalar plus scalar) instruction loads data from memory to a vector. In the particular example, the loaded data may be stored in the vector as doublewords (indicated by the .D suffix). In this particular example, the vector is stored in the register Z4, governed by the predicate register P2. In the vector instruction syntax shown above, the suffix/Z for the predicate P2 indicates that zeroing predication is used such that the inactive elements of the result are set to zero. Merging predication could also be used (/M suffix) in which the inactive elements keep the same value that was previously stored in the corresponding elements of the destination register. The data is loaded from a memory location identified by registers X26 and X20, which may provide a base and offset for identifying the location in memory. LSL #2 indicates a logical shift left value by which the offset should be shifted, in this case a left shift by 2 multiplies the offset by 4 before it is added to the base address. It will hence be seen that this instruction loads some data from memory and stores it in the register Z4.

The LD1D (scalar plus vector) instruction loads data from memory to a register Z5 (which is a vector register) under control of predicate P2. In this case, the base (referred to elsewhere as an offset) is provided by register X25 and the index to be combined with the offset is provided by elements of the register Z4, such that the LD1D instruction can cause several memory accesses to different addresses. The indices provided in Z4 are left shifted by 3 so that they are multiplied by 8 before being added to the base address.

It will be seen that this instruction causes the data previously loaded into register Z4 by the LD1SW instruction to be used to generate addresses for subsequent memory access requests.

In the particular case illustrated above, the second instruction loads several data values using a vector of indices. This may be the case in examples such as that illustrated in FIG. 5 (to be discussed below) where an array of indices is loaded from memory and used to access several locations in memory. However, it will be appreciated that the example instructions provided above are merely for illustration. Many different types of instruction or sequences of instructions could be observed in which data is loaded from memory and used to generate an address for a subsequent load, and in some examples each instruction loads data from only one location in memory.

In any case, in the present example once the CPU 300 has observed both the LD1SW instruction loading data to Z4 and the LD1D instruction using the data in Z4 to load further data, then it may determine that memory access requests issued in response to the LD1SW instruction should be associated with the hint information so that the data to be loaded can be used for prefetching the data to be requested by LD1D. To allow the hint information to be associated with the memory access requests associated with the LD1SW instruction before they are issued, the CPU 300 may detect such patterns of instructions relatively early in the pipeline, such as at the decode stage 18. In certain examples, merely observing the LD1SW instruction (even before decoding the LD1D instruction) may be enough to allow an assumption to be made that the LD1D instruction will eventually follow, and therefore in some workloads the hint can be associated with memory accesses performed in response to the LD1SW instruction, even when a subsequent instruction has not yet been observed using the loaded data for memory accesses.

Issuing a prefetch request to an address identified by data loaded in response to a demand access request can be useful, because it can allow data to be present in the cache before a subsequent memory access request to access that data is issued. However, the prefetching distance when prefetching in response to a demand access request may be relatively limited, and the data may be required relatively quickly after the first demand access request is observed. To increase the prefetching distance which can be achieved using the present technique, the inventors realised that in addition to demand access requests, indirect prefetches can be performed using data requested by prefetch requests when it is anticipated that that data is address indicating data.

Figure 5:
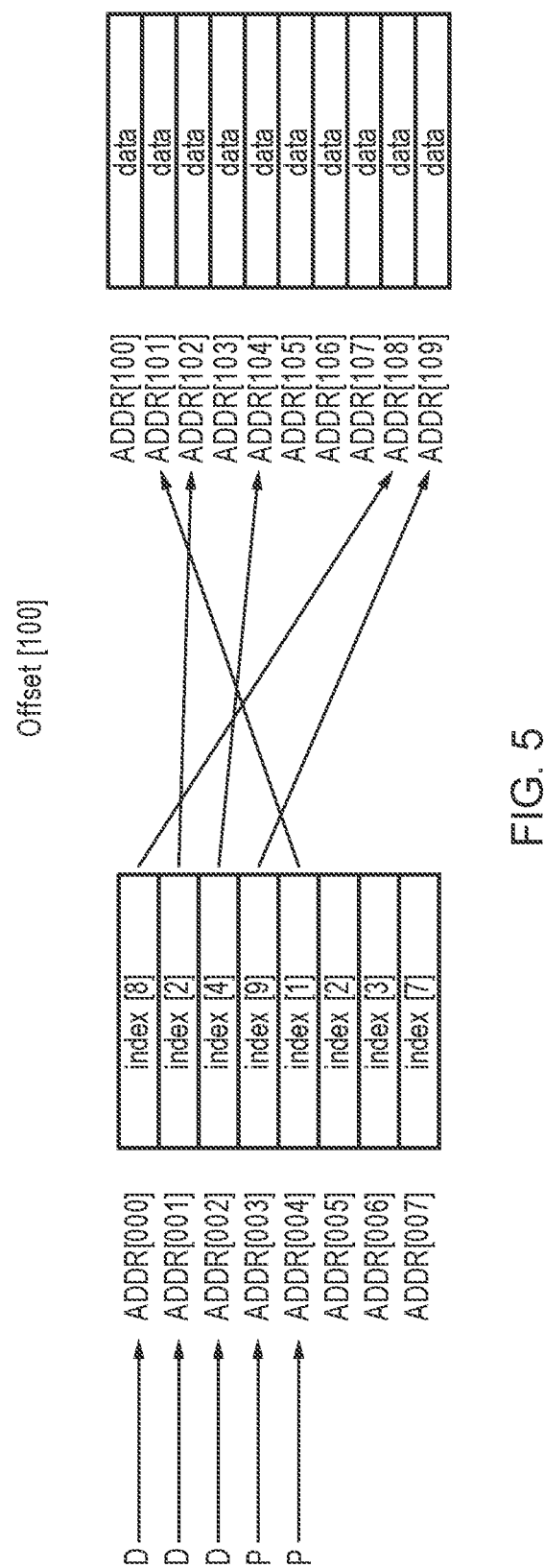
FIG. 5 schematically illustrates an address space and memory access requests for illustrating concepts described herein.

An example is illustrated in FIG. 5, which shows the same addresses as FIG. 2. Memory access requests are illustrated with arrows. For example, an arrow to an address in the left block is an access to a location in memory storing address indicating data, and an arrow from a location in the left block to a location in the right block indicates the use of that address indicating data to form an address for a subsequent memory access (e.g., the topmost arrow to the left block is an access request to address 000 storing data 008, where the data 008 is used to form address 108 for a subsequent memory access to address 108).

In some access patterns, the address indicating data is stored at regular addresses in memory. Hence, patterns in accesses to locations storing the address indicating data may be identified by pattern detection circuitry 308. Therefore, prefetch requests may be issued to prefetch address indicating data in anticipation of receiving memory access requests for that data. Note that this does not mean that patterns can be identified in the subsequent accesses based on the loaded data as discussed previously, in other words the block of addresses indicated on the left (the array of indices) can be prefetched based on pattern detection because those addresses may be accessed in a regular way, whereas the block of addresses illustrated on the right which are accessed based on data in the array cannot be prefetched based on pattern detection. In FIG. 5, demand access requests and prefetch requests are indicated with letters "D" and "P" respectively. Although it will be appreciated that this is just an example, in FIG. 5 prefetches to addresses and are issued after two demand accesses following a stride pattern have been identified (in FIG. 5 the stride is a simple +1 stride) to addresses [001] and [002] (following an initial access to address [000]).

In some examples, the associating circuitry is configured to associate the indirect prefetch condition with prefetch requests (such as the prefetches to addresses and [004]) in response to determining that those prefetch requests form part of a series of memory access requests (such as the +1 stride sequence starting with address [000]) and another access request in the series has been associated with the indirect prefetch condition (e.g., the demand access request to address [000] (and optionally the demand access requests to addresses [001] and [002]) may have been associated with the indirect prefetch condition based on hint information provided by the CPU 300 in association with one or more of those demand access requests). To associate a prefetch request with the indirect prefetch condition, the prefetcher may cause those prefetch requests to be issued in association with hint information indicating that said request is for address indicating data. The pattern detection circuitry may maintain internal state indicating whether a particular identified sequence of addresses is associated with the indirect prefetch condition, to allow prefetch requests issued as part of that sequence to be associated with the indirect prefetch condition. In the case that prefetch access requests are associated with the indirect prefetch condition, prefetched data (e.g., from addresses [003] and [004]) can be used by the address generation circuitry 306 to calculate addresses for further prefetches (to addresses [109] and [101]). These further prefetch requests based on prefetched address indicating data could prefetch data further ahead than prefetches performed only in response to observing demand access requests.

An example sequence of memory access requests is provided below to illustrate these concepts (the sequence below shows a logical sequence rather than necessarily the actual order in which the various access requests are issued, and it will be appreciated that the ordering of the access requests may vary in some cases, and hence for example multiple of the initial demand accesses may occur before any of the prefetch requests are issued):

DEMAND ADDR [000] (HINT)—a demand access request is observed for loading address indicating data as indicated by the associated hint information.

PREFETCH ADDR [108]—based on the demand access to address [000] being associated with hint information, the associating circuitry 304 associates the request with the indirect prefetch condition. Address generation circuitry 306 calculates address [108] based on the address indicating data [008] loaded from memory in response to the memory access request (using offset [100] which may have been provided by the CPU 300 in the access request for address [000] or separately).

DEMAND ADDR [001] (HINT)—a further demand access request is observed, also associated with hint information PREFETCH ADDR [102]—a prefetch is performed based on address indicating data returned in response to the demand access request to address [001], due to the demand being associated with the indirect prefetch condition because it was issued in association with hint information.

DEMAND ADDR [002] (HINT)

PREFETCH ADDR [104]—a further demand access request is observed and prefetch performed, as above.

At this point, the pattern detection circuitry may detect a +1 stride pattern in the demand access requests to addresses [000], [001], and [002]. Therefore, the prefetch request issuing circuitry may be caused to issue prefetch requests to further addresses following this pattern:

PREFETCH ADDR [003]

PREFETCH ADDR [004]

It is noted that the pattern detection circuitry does not identify a pattern associated with accesses to addresses [108], [102], and [104] because they do not follow a pattern.

Because the prefetch requests to addresses [003] and [004] are based on a pattern detected in demand access requests associated with the indirect prefetch condition, these prefetch addresses may be associated with the indirect prefetch condition by associating circuitry 304 (in some examples, the prefetch requests may be issued in association with hint information to identify that they should be associated with the indirect prefetch condition).

Because they have been associated with the indirect prefetch condition, when data is returned in response to the prefetch requests, the returned data is used to calculate addresses and further prefetch requests are issued based on the calculated addresses:

PREFETCH ADDR [109]

PREFETCH ADDR [101]

In this way, data at locations in memory that do not follow a particular pattern can be prefetched based on identifying (using hint information) memory access requests for accessing address indicating data. By prefetching the address indicating data itself, prefetching distance can be increased.

Figure 6:
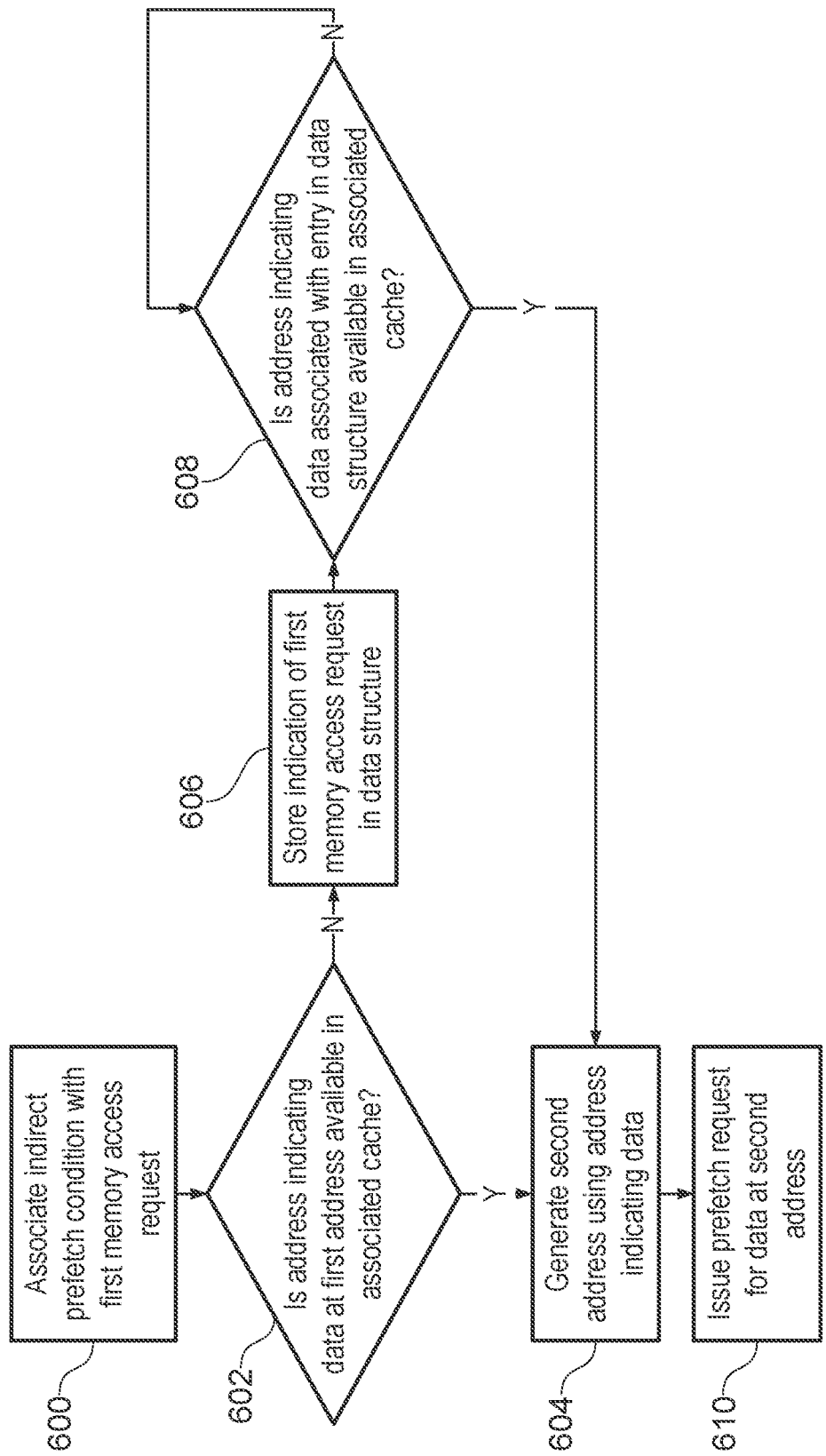
FIG. 6 is a flow diagram illustrating a method according to examples of the present technique.

FIG. 6 is a flow diagram illustrating a method according to examples of the present technique. Associating circuitry 304 observes a memory access request for accessing data at a first address, where the memory access request may be either a demand access request issued by CPU 300, or a prefetch request 314 issued by the prefetcher. In response to determining that the observed memory access request is associated with hint information (such as based on the state of a field in the memory access request), the associating circuitry 304 associates the memory access request with the indirect prefetch condition at step 600, indicating that it is anticipated that the memory access request is for address indicating data and therefore it may improve performance if a prefetch request is issued on the basis of the returned data.

In response to associating the access request with the indirect prefetch condition, the associating circuitry 304 provides an indication of the first address to the address generating circuitry 306. The address generating circuitry 306 then, at step 602, determines whether data (anticipated to be address indicating data) at the first address is available in an associated cache 318.

If the address indicating data is not available in the cache, then at step 606 the address generation circuitry 306 causes an indication of the first memory access request to be stored in an indirect prefetch buffer 310. The indication of the first memory access request provides enough information to identify when the address indicating data is available in the associated cache 318, and for example could be an indication of the first address. It is anticipated that the address indicating data at the first address will be made available in the cache 318 in response to the first memory access request, so the buffer 310 is for temporarily indicating which data, when it is made available in the cache, is to be used for generating addresses for prefetching.

At step 608 it is determined whether the data at the first address has become available in the cache 318. More generally, it is determined whether data associated with any entry of the indirect prefetch buffer 310 has become available in the cache. The cache could, for example, be regularly polled to determine if data associated with a buffer entry has become available. If not, then the process remains at step 608.

However, when it is determined that the data associated with the first address has become available in the associated cache 318, then at step 604 the data is retrieved and provided to the address generation circuitry 306 (or processing proceeds directly from step 602 to 604 if the data is available at the time step 602 is performed). The address generation circuitry 306 uses the address indicating data at the first address to generate a second address. For example, the address generation circuitry 306 may combine the retrieved data with an offset to provide the second address. The offset may have been provided to the address generation circuitry 306 by the CPU 300, and may remain the same during certain periods of processing (e.g., whilst accessing a particular region of memory), or could be specific to a particular access request (in which case it may be provided alongside hint information in the access request). In some examples, the address indicating data is a pointer to the second address in memory and combination with an offset is not required.

At step 610, after the address indicating data has been used to generate the second address, the prefetch request issuing circuitry 312 issues a prefetch request directed to the second address, seeking to make the data at the second address available in the cache in anticipation of a subsequent demand access request for that data.

In the way illustrated in FIG. 6, a prefetcher is configured to make data available in a cache before it is requested in a demand access request to reduce cache misses, even in cases where the data is located at an address in memory which cannot be determined by monitoring access patterns of the CPU 300.

Figure 7:
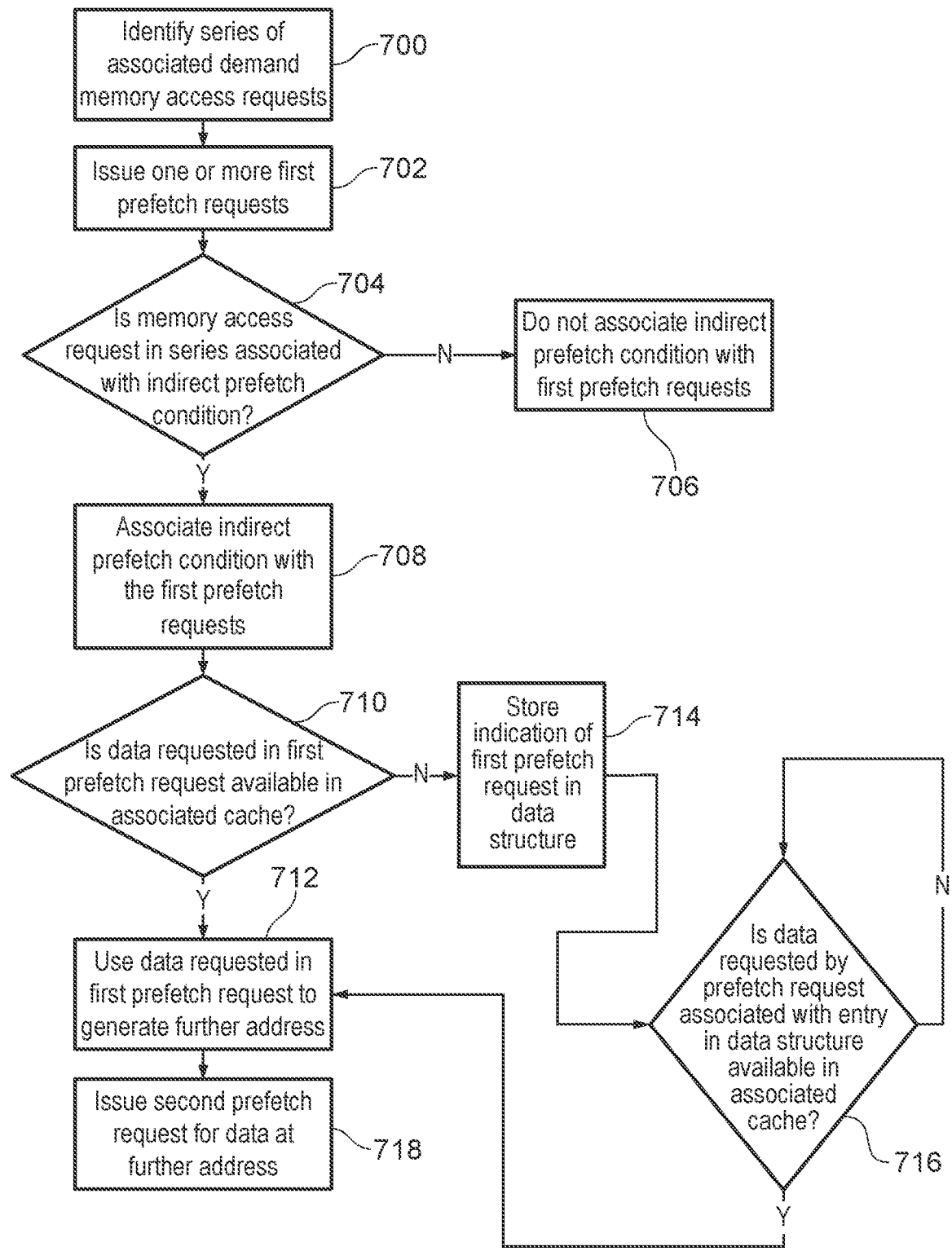
FIG. 7 is a flow diagram illustrating a method according to examples of the present technique.

FIG. 7 is a flow diagram illustrating in further detail the method of FIG. 6 in the case that the first memory access request is a prefetch request.

At step 700, the pattern detection circuitry 308 identifies a series of associated demand memory access requests 302 issued by the CPU 300. For example, the pattern detection circuitry 308 may identify a pattern in the addresses to be accessed by a number of demand access requests. The pattern could be a stride pattern, where observed memory access requests are for accessing addresses separated by a regular value (e.g., in the example of FIG. 5, a stride of +1 could be identified based on observing access to addresses [000], [001], and [002]).

At step 702, the prefetch request issuing circuitry 312 issues one or more first prefetch requests based on extrapolating the pattern identified by the pattern detection circuitry 308. For example, if a series having a stride of +1 has been identified and the most recent demand access request in the series was to address [002], then prefetch requests could be issued to addresses [003] and [004] (the number of prefetch requests issued depends on the prefetch distance of the particular system).

At step 704, it is determined whether one or more memory access requests in the series identified in step 700 have been associated with the indirect prefetch condition. For example, it may be determined whether any of the demand access requests observed as part of the series were issued by the CPU 300 in association with hint information.

If not, then it can be determined that the series of one or more first prefetch requests issued at step 702 are not anticipated to access address indicating data. Therefore, at step 706 it can be determined that it would be inappropriate to prefetch data based on the data requested in the one or more prefetch requests, and said one or more first prefetch requests are not associated with the indirect prefetch condition.

If, however, it is determined that at least one of the memory access requests in the series of memory access requests identified at step 700 has been associated with the indirect prefetch condition (e.g., because it was associated with hint information), then it may be assumed that the entire series is for accessing address indicating data. For example, this could identify a situation as indicated in FIG. 5 where a regular array of indices (address indicating data) is being accessed, and therefore a situation where the one or more first prefetch requests are for accessing address indicating data. In such a case, it could be beneficial to issue further prefetch requests to addresses calculated using prefetched address indicating data, to provide prefetching further ahead of the demand access requests. Hence, at step 708 the one or more first prefetch requests may be associated with the indirect prefetch condition.

There are different ways that a prefetch request may be associated with the indirect prefetch condition. In one example, the prefetch request is issued by the prefetcher 40 in association with hint information indicating that said prefetch request is for accessing address indicating data (such that when the associating circuitry observes the prefetch request, the process of FIG. 6 is carried out). In another example, the associating circuitry 304 may keep a record of prefetch requests issued by the prefetch request issuing circuitry 312 which are to be associated with the indirect prefetch condition.

It will be appreciated that in the example where the one or more prefetch requests are issued with hint information, step 702 (where the prefetch requests are issued) may take place after step 708, although this is not required in other examples.

At step 710, one or more prefetch requests have been issued and have been associated with the indirect prefetch condition (indicating that prefetched data is to be used for generating addresses for prefetching). From this point, the process illustrated in FIG. 6 is carried out for each of the one or more first prefetch requests, with each first prefetch request being a first memory access request as considered by FIG. 6.

Hence, at step 710 it is determined whether data requested in a first prefetch request is available in the associated cache 318. If not, then the address of the first prefetch request is stored in the indirect prefetch buffer 310 until such data is available in the cache (steps 714 and 716, corresponding to steps 606 and 608 of FIG. 6).

When data requested in a first prefetch request is available in the cache 318, the address generation circuitry 306 uses this prefetched address indicating data to generate a further address at step 712, and at step 718 the prefetch request issuing circuitry 312 issues a second prefetch request to the further address generated by the address generation circuitry 306.

In the way illustrated in FIG. 7, a prefetcher can make data available in a cache in cases where the data is stored at an arbitrary address in memory, even before observing a demand access request for accessing data at that arbitrary address in memory, based on the prefetching such address indicating data.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
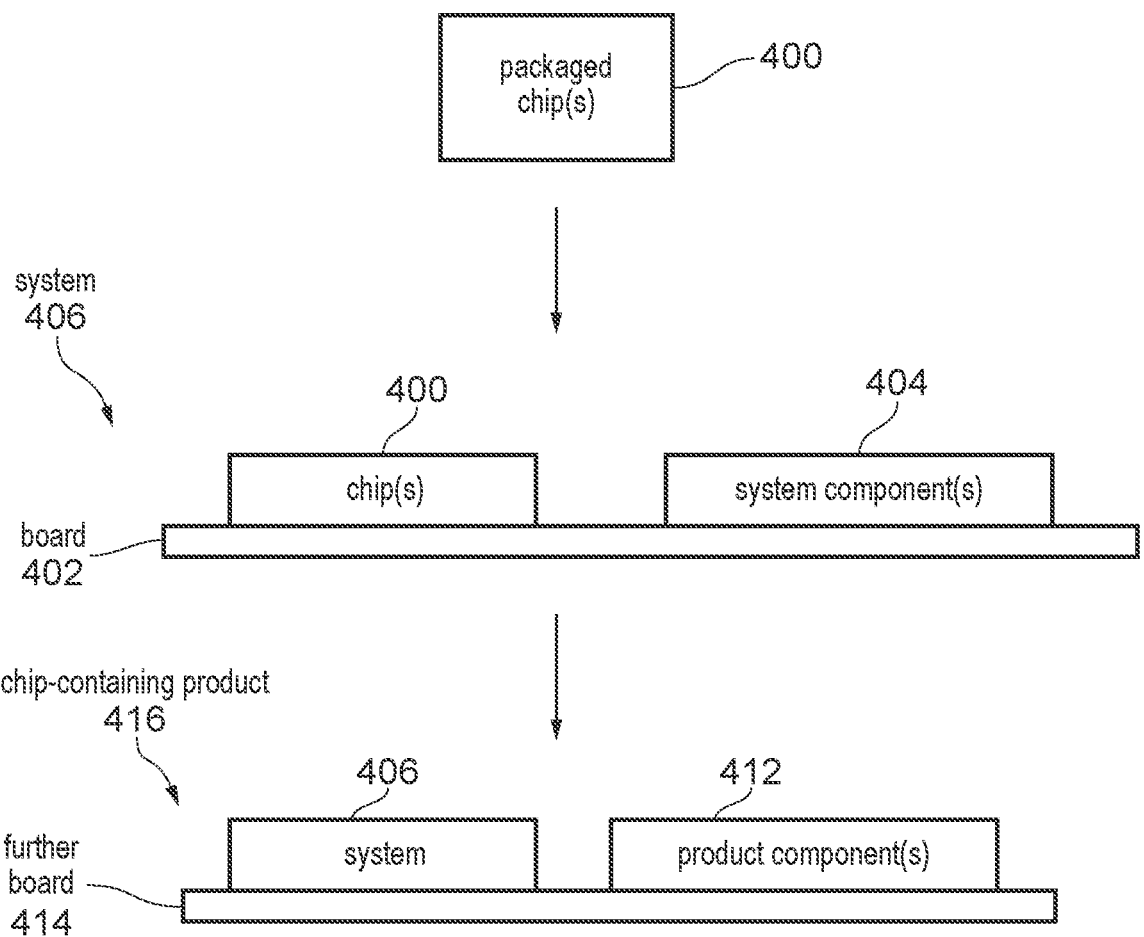
FIG. 8 illustrates a system and a chip-containing product.

As shown in FIG. 8, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:

associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;

address generating circuitry, responsive to association of the indirect prefetch condition with the first memory access request and determination that the address indicating data associated with the first address is available in an associated cache, to generate a second address using the address indicating data; and prefetch request issuing circuitry configured to issue prefetch memory access requests to seek to make data available in the associated cache in anticipation of access to said data being requested by the associated processing circuitry;
wherein the prefetch request issuing circuitry, responsive to the address generating circuitry generating the second address, is arranged to issue a prefetch memory access request to seek to make data at the second address available in the associated cache.

(2) The apparatus according to clause 1, wherein the associating circuitry is arranged to:
observe demand memory access requests issued by the associated processing circuitry to access data in the memory system; and
associate the indirect prefetch condition with a given demand memory access request issued by the associated processing circuitry in association with the hint information.

(3) The apparatus according to clause 2, wherein
the hint information is provided within the given demand memory access request.

(4) The apparatus according to any preceding clause, comprising:
pattern detection circuitry to observe demand memory access requests issued by the associated processing circuitry and identify a series of associated demand memory access requests for accessing data at a corresponding series of addresses following an identified pattern.

(5) The apparatus according to clause 4, wherein
the prefetch request issuing circuitry is configured to issue one or more first prefetch memory access requests seeking to make data at one or more extrapolated addresses available in the associated cache, where the one or more extrapolated addresses follow the identified pattern of addresses, in advance of observing demand memory access requests issued by the associated processing circuitry for data at the one or more extrapolated addresses; and
responsive to determining that at least one demand memory access request in the series of associated demand memory access requests is associated with the indirect prefetch condition, the associating circuitry is configured to associate the indirect prefetch condition with the one or more first prefetch memory access requests.

(6) The apparatus according to clause 5, wherein
the address generating circuitry is responsive to determination that address indicating data requested in a given first prefetch memory access request associated with the indirect prefetch condition is available in the associated cache, to generate a further address using the address indicating data; and
the prefetch request issuing circuitry is responsive to the address generating circuitry generating the further address to issue a further prefetch memory access request to seek to make data at the further address available in the associated cache.

(7) The apparatus according to any of clauses 4 to 6, wherein
responsive to determining that an earlier demand memory access request in the series of associated demand memory access requests is associated with the indirect prefetch condition, the associating circuitry is configured to associate the indirect prefetch condition with one or more later demand memory access requests in the series of associated demand memory access requests.

(8) The apparatus according to any of clauses 4 to 7, wherein
the pattern detection circuitry is configured to identify the series of associated demand memory access requests based on detecting the identified pattern of addresses.

(9) The apparatus according to clause 8, wherein
the pattern detection circuitry is configured to detect the identified pattern of addresses based on observing demand memory access requests for addresses following a regular pattern.

(10) The apparatus according to any of clauses 4 to 7, wherein
the pattern detection circuitry is configured to identify the series of associated demand memory access requests based on receiving pattern hint information indicative of the identified pattern of addresses.

(11) The apparatus according to any preceding clause, comprising the associated processing circuitry configured to perform data processing operations in response to instructions, wherein
the associated processing circuitry is configured to transmit the hint information to the associating circuitry in respect of a given demand memory access request in response to detecting one or more instructions indicating that data returned in response to the given demand memory access request is to be used to generate an address for a subsequent demand memory access request.

(12) The apparatus according to clause 11, wherein
the associated processing circuitry is configured to transmit the hint to the associating circuitry in response to detecting a sequence of two or more instructions in which execution of a first instruction will cause the given demand memory access request to be issued in order to store data in a given storage location and execution of a subsequent instruction will cause that data stored in the given storage location to be used to generate an address for accessing the memory system.

(13) The apparatus according to any of clauses 11 to 12, wherein
the associated processing circuitry is configured to transmit the hint to the associating circuitry in response to detecting a predetermined type of instruction corresponding to the given demand memory access request.

(14) The apparatus according to any preceding clause, wherein
in order to generate the second address, the address generating circuitry is configured to combine at least part of the address indicating data with an offset; and
the address generating circuitry is configured to receive an indication of the offset from the associated processing circuitry.

(15) The apparatus according to clause 14, wherein
the address generating circuitry is configured to receive an indication of the offset within a demand memory access request.

(16) The apparatus according to any preceding clause, comprising
indirect prefetch buffer circuitry responsive to association of the indirect prefetch condition with the first memory access request and determination that the address indicating data associated with the first address is not yet available in the associated cache to store in an entry of a data structure information to enable the address generating circuitry to identify when the address indicating data associated with the first address is available in the associated cache so that it may generate the second address using said address indicating data; wherein in response to a determination that address indicating data corresponding to an entry of the data structure is available in the associated cache, the address generating circuitry is configured to generate the second address using said address indicating data.

(17) A data processing method, comprising:
associating an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
generating, in response to association of the indirect prefetch condition with the first memory access request and determination that the address indicating data associated with the first address is available in an associated cache, a second address using the address indicating data; and
issuing, responsive to the generation of the second address, a prefetch memory access request to seek to make data at the second address available in the associated cache.

(18) A non-transitory computer-readable medium to store computer-readable code for fabrication of an apparatus comprising:
associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
address generating circuitry, responsive to association of the indirect prefetch condition with the first memory access request and determination that the address indicating data associated with the first address is available in an associated cache, to generate a second address using the address indicating data; and
prefetch request issuing circuitry configured to issue prefetch memory access requests to seek to make data available in the associated cache in anticipation of access to said data being requested by the associated processing circuitry;
wherein the prefetch request issuing circuitry, responsive to the address generating circuitry generating the second address, is arranged to issue a prefetch memory access request to seek to make data at the second address available in the associated cache.

(19) A system comprising:
the apparatus of any of clauses 1 to 16, implemented in at least one packaged chip;
at least one system component; and
a board,
wherein the at least one packaged chip and the at least one system component are assembled on the board.

(20) A chip-containing product comprising the system of clause 19 assembled on a further board with at least one other product component.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;
address generating circuitry, responsive to association of the indirect prefetch condition with the first memory access request and determination that the address indicating data associated with the first address is available in an associated cache, to generate a second address using the address indicating data;
prefetch request issuing circuitry configured to issue prefetch memory access requests to seek to make data available in the associated cache in anticipation of access to said data being requested by the associated processing circuitry;
wherein the prefetch request issuing circuitry, responsive to the address generating circuitry generating the second address, is arranged to issue a prefetch memory access request to seek to make data at the second address available in the associated cache; and
the apparatus comprises the associated processing circuitry configured to perform data processing operations in response to instructions, wherein
the associated processing circuitry is configured to transmit the hint information to the associating circuitry in respect of a given demand memory access request in response to detecting one or more instructions indicating that data returned in response to the given demand memory access request is to be used to generate an address for a subsequent demand memory access request.

2. The apparatus according to claim 1, wherein the associating circuitry is arranged to:

observe demand memory access requests issued by the associated processing circuitry to access data in the memory system; and associate the indirect prefetch condition with a given demand memory access request issued by the associated processing circuitry in association with the hint information.

3. The apparatus according to claim 2, wherein the hint information is provided within the given demand memory access request.

4. The apparatus according to claim 1, comprising:

pattern detection circuitry to observe demand memory access requests issued by the associated processing circuitry and identify a series of associated demand memory access requests for accessing data at a corresponding series of addresses following an identified pattern.

5. The apparatus according to claim 4, wherein the prefetch request issuing circuitry is configured to issue one or more first prefetch memory access requests seeking to make data at one or more extrapolated addresses available in the associated cache, where the one or more extrapolated addresses follow the identified pattern of addresses, in advance of observing demand memory access requests issued by the associated processing circuitry for data at the one or more extrapolated addresses; and responsive to determining that at least one demand memory access request in the series of associated demand memory access requests is associated with the indirect prefetch condition, the associating circuitry is configured to associate the indirect prefetch condition with the one or more first prefetch memory access requests.

6. The apparatus according to claim 5, wherein the address generating circuitry is responsive to determination that address indicating data requested in a given first prefetch memory access request associated with the indirect prefetch condition is available in the associated cache, to generate a further address using the address indicating data; and the prefetch request issuing circuitry is responsive to the address generating circuitry generating the further address to issue a further prefetch memory access request to seek to make data at the further address available in the associated cache.

7. The apparatus according to claim 4, wherein responsive to determining that an earlier demand memory access request in the series of associated demand memory access requests is associated with the indirect prefetch condition, the associating circuitry is configured to associate the indirect prefetch condition with one or more later demand memory access requests in the series of associated demand memory access requests.

8. The apparatus according to claim 4, wherein the pattern detection circuitry is configured to identify the series of associated demand memory access requests based on detecting the identified pattern of addresses.

9. The apparatus according to claim 8, wherein the pattern detection circuitry is configured to detect the identified pattern of addresses based on observing demand memory access requests for addresses following a regular pattern.

10. The apparatus according to claim 4, wherein the pattern detection circuitry is configured to identify the series of associated demand memory access requests based on receiving pattern hint information indicative of the identified pattern of addresses.

11. The apparatus according to claim 1, wherein the associated processing circuitry is configured to transmit the hint to the associating circuitry in response to detecting a sequence of two or more instructions in which execution of a first instruction will cause the given demand memory access request to be issued in order to store data in a given storage location and execution of a subsequent instruction will cause that data stored in the given storage location to be used to generate an address for accessing the memory system.

12. The apparatus according to claim 1, wherein the associated processing circuitry is configured to transmit the hint to the associating circuitry in response to detecting a predetermined type of instruction corresponding to the given demand memory access request.

13. The apparatus according to claim 1, wherein in order to generate the second address, the address generating circuitry is configured to combine at least part of the address indicating data with an offset; and the address generating circuitry is configured to receive an indication of the offset from the associated processing circuitry.

14. The apparatus according to claim 13, wherein the address generating circuitry is configured to receive an indication of the offset within a demand memory access request.

15. An apparatus, comprising:

associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;

address generating circuitry, responsive to association of the indirect prefetch condition with the first memory access request and determination that the address indicating data associated with the first address is available in an associated cache, to generate a second address using the address indicating data;

prefetch request issuing circuitry configured to issue prefetch memory access requests to seek to make data available in the associated cache in anticipation of access to said data being requested by the associated processing circuitry;

wherein the prefetch request issuing circuitry, responsive to the address generating circuitry generating the second address, is configured to issue a prefetch memory access request to seek to make data at the second address available in the associated cache; and indirect prefetch buffer circuitry responsive to association of the indirect prefetch condition with the first memory access request and determination that the address indicating data associated with the first address is not yet available in the associated cache to store in an entry of a data structure information to enable the address generating circuitry to identify when the address indicating data associated with the first address is available in the associated cache so that it may generate the second address using said address indicating data; wherein in response to a determination that address indicating data corresponding to an entry of the data structure is available in the associated cache, the address generating circuitry is configured to generate the second address using said address indicating data.

16. A non-transitory computer-readable medium to store computer-readable code for fabrication of an apparatus comprising:

associating circuitry configured to associate an indirect prefetch condition with a first memory access request, for accessing data at a first address in a memory system, in response to anticipating, based on hint information received from associated processing circuitry, that the data to be accessed at the first address in response to the first memory access request is address indicating data which is to be used to generate a second address for a subsequent memory access request;

address generating circuitry, responsive to association of the indirect prefetch condition with the first memory access request and determination that the address indicating data associated with the first address is available in an associated cache, to generate a second address using the address indicating data;

prefetch request issuing circuitry configured to issue prefetch memory access requests to seek to make data available in the associated cache in anticipation of access to said data being requested by the associated processing circuitry;

wherein the prefetch request issuing circuitry, responsive to the address generating circuitry generating the second address, is arranged to issue a prefetch memory access request to seek to make data at the second address available in the associated cache; and the apparatus comprises the associated processing circuitry configured to perform data processing operations in response to instructions, wherein the associated processing circuitry is configured to transmit the hint information to the associating circuitry in respect of a given demand memory access request in response to detecting one or more instructions indicating that data returned in response to the given demand memory access request is to be used to generate an address for a subsequent demand memory access request.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

* * * * *